(12) United States Patent
Hong et al.

(10) Patent No.: US 6,882,373 B2
(45) Date of Patent: Apr. 19, 2005

(54) DIGITAL DEMODULATING DEVICE IN A DIGITAL TV RECEIVER

(75) Inventors: Sung Ryong Hong, Kyonggi-do (KR); Joon Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 498 days.

(21) Appl. No.: 10/067,199

(22) Filed: Feb. 7, 2002

(65) Prior Publication Data

US 2002/0105599 A1 Aug. 8, 2002

(30) Foreign Application Priority Data

Feb. 7, 2001 (KR) .......................................... 2001-5920

(51) Int. Cl.[7] .............................................. H04N 5/455
(52) U.S. Cl. ..................................... 348/726; 375/326
(58) Field of Search ......................... 348/726, 638–641, 348/614; 375/322, 324, 326, 327, 346, 348, 350; 329/348, 350, 357, 349

(56) References Cited

U.S. PATENT DOCUMENTS 5,612,975 A * 3/1997 Becker et al. .............. 375/319
6,005,640 A * 12/1999 Strolle et al. ............... 348/726
6,198,780 B1 * 3/2001 Kang .......................... 375/321
6,396,550 B1 * 5/2002 Oh .............................. 348/735
6,621,527 B1 * 9/2003 Limberg et al. ............ 348/725
6,680,971 B1 * 1/2004 Tazebay et al. ............. 375/235

* cited by examiner

*Primary Examiner*—Victor R. Kostak
(74) *Attorney, Agent, or Firm*—Birch, Stewart, Kolasch & Birch, LLP

(57) ABSTRACT

A VSB demodulating device and method in a DTV receiver is disclosed, in which a VSB signal is received for independent carrier wave recovery and symbol clock recovery. An A/D converter samples the output of a SAW filter with a fixed frequency and converts the resultant value to a digital signal. A carrier wave recovery portion recovers a carrier wave from a base band pilot signal output from a multiplier, and a timing recovery portion recovers a symbol clock used for a transmitter using the output of a matched filter disposed in a base band. In this case, the carrier wave recovery portion and the timing recovery portion are independently operated without affecting each other. Thus, the carrier wave recovery portion is operated stably even in case where a fatal ghost exists in a band used for timing recovery. Furthermore, since a closed loop control can be implemented independently for carrier wave recovery and timing recovery, stability of the system is improved, thereby improving performance of the DTV receiver.

14 Claims, 2 Drawing Sheets

DIGITAL DEMODULATING DEVICE IN A DIGITAL TV RECEIVER

This application claims the benefit of the Korean Application No. P2001-05920 filed on Feb. 7, 2001.

BACKGROUND OF THE INVENTION

1. Field of the Invention

The present invention relates to a digital TV(DTV), and more particularly, to a vestigial sideband (VSB) demodulating device and method in a DTV receiver, in which a VSB signal is received for independent carrier wave recovery and symbol clock recovery.

2. Discussion of the Related Art

Generally, a VSB mode of Grand Alliance employed as the standard of a digital TV (for example, HDTV) transmission mode in the United States of America and Korea modulates one of two side bands generated up and down based on a carrier wave when amplitude of a signal is modulated while attenuates the other. That is to say, the VSB mode transmits one side band spectrum of a base band to a pass band, so that a band region can effectively be used.

In case of VSB modulation, DC spectrum of a base band is changed to a tone spectrum in a pass band. The tone spectrum is generally called a pilot signal. That is, a broadcasting station modulates a VSB signal, a receiver blows the pilot signal away in the air to exactly demodulate the signal.

FIG. 1 is a block diagram illustrating a general digital TV receiver. Referring to FIG. 1, a VSB demodulating device includes an analog-to-digital (A/D) converter 103, a phase divider 104, a multiplier 105, a timing recovery portion 108, a carrier waver recovery portion 113, and a channel equalizer 107.

That is, if a radio frequency (RF) signal modulated in a VSB mode is received through an antenna, a tuner 101 selects a desired channel frequency. Then, the tuner 101 transits a VSB signal of an RF band inserted in the channel frequency to a fixed intermediate frequency (IF) band of 44 MHz or 43.75 MHz and properly filters other channel signal.

An output signal of the tuner 101 passes through a surface acoustic wave (SAW) filter 102 employed to remove other band signal and a noise signal and used as an analog matched filter.

At this time, since all the required information exist in a band between 44 MHz and 6 MHz of a digital broadcasting signal, the SAW filter 102 removes all the periods other than a band of 6 MHz with information from the output of the tuner 101 and outputs the signal of 6 MHz to the A/D converter 103.

The A/D converter 103 samples the output of the SAW filter 102 with a fixed frequency of 25 MHz and digitizes the sampled frequency. A matched filter 104 adjusts a signal-to-noise ratio (SNR) of the digitized signal at a symbol position and outputs the digitized signal to a resampler 105 for recovery of a digital symbol clock.

The resampler 105 receives a timing error of current symbols generated by signal processing of a base band from a timing recovery portion 109 and interpolates the timing error to reduce an error between the digitized signals. That is, the digital signal sampled at 25 MHz is interpolated at n times (n=2 in case of VSB) of a real symbol rate through the resampler 105.

The output of the resampler 105 is input to a phase divider 106, divided into components I and Q by the phase divider 106, and output to the multiplier 107.

The multiplier 107 receives a complex sinusoidal wave with a recovered carrier wave through a numerically controlled oscillator (NCO) 116 and multiplies the complex sinusoidal wave by signals I and Q of a pass band output from the phase divider 106 and lowers the signals I and Q of the pass band to a base band.

The signals I and Q of the base band output from the multiplier 107 are output to the timing recovery portion 109, the carrier wave recovery portion 113, and the channel equalizer 108.

At this time, once the output of the multiplier 107 passes through the channel equalizer 108, distortion generated by passing through a channel included in the output of the multiplier 107 is compensated. Also, the channel equalizer 108 recovers synchronizing signals inserted during transmission from the signal I of the base band and recovers received data, i.e., transmitting symbols using the synchronizing signals.

The carrier wave recovery portion 113 removes phase error and frequency offset of the carrier wave from a pilot signal of the base band output from the multiplier 107 and feeds back a corresponding complex sinusoidal wave to the multiplier 107. Therefore, the multiplier 107 outputs the digital signals I and Q of the base band with the recovered frequency offset and phase error.

To this end, the carrier wave recovery portion 113 includes a frequency phase error detector (FPED) 114, a loop filter 115, and an NCO 116. That is, the FPED 114 detects the frequency offset and the phase error from the pilot signal of the base band output from the multiplier 107 and outputs the detected frequency offset the phase error to the loop filter 115.

The loop filter 115 filters and integrates the output of the FPED 114 and outputs a final value to the NCO 116. The NCO 116 generates a complex sinusoidal wave relative to the output of the loop filter 115 and outputs the complex sinusoidal wave to the multiplier 107.

In other words, frequency offset of several hundreds of KHz and phase error are generated by a tuner or an RF oscillator during VSB signal reception. The frequency offset and phase error are required to be minimized for exact data recovery. At this time, acquisition and tracking are performed to minimize the frequency offset and phase error. This acquisition and tracking process is called carrier wave recovery.

Meanwhile, the timing recovery portion 109 generates the same symbol clock as that used during transmission to recover transmission data at a receiving party. This is because that an advanced television systems committee (ATSC) VSB transmission system proposed by a US directed digital TV (DTV) receiver loads data only in a transmission signal. At this time, the timing recovery portion 109 implements timing recovery during a data segment synchronizing signal period regularly inserted in a transmitting party.

To this end, the timing recovery portion 109 includes a timing error detector 110, a low pass filter (LPF) 111, and an NCO 112. The timing error detector 110 detects timing error information from the output of the multiplier 107. The LPF 111 passes through low band signal components only from the timing error information. The NCO 112 controls sampling timing of the resampler 105 by converting the output frequency in accordance with low band components of the timing error.

In other words, the timing error detector 110 detects the timing error information from the output of the multiplier 107 and outputs the detected timing error information to the LPF 111. The LPF 111 filters the low band signal components only from the timing error information detected by the timing error detector 110 and outputs the filtered low band signal components to the NCO 112. The NCO 112 converts the output frequency in accordance with the low band components of the timing error information and controls sampling timing of the resampler 105.

At this time, the carrier wave recovery portion 113 detects frequency phase error from a band with the pilot signal on the frequency spectrum. The timing recovery portion 109 detects timing error information from an opposite band with no pilot signal.

As described above, the VSB demodulating device of FIG. 1 is implemented by only a digital device without depending on an analog device. Accordingly, the VSB demodulating device can be implemented by an optimal parameter.

However, the VSB demodulating device of FIG. 1 is configured such that the carrier wave recovery portion 113 and the timing recovery portion 109 do not operate independently but operate to affect each other. In this case, once a problem occurs in the timing recovery portion 109, the problem directly affects the carrier wave recovery portion 113, and vice versa. As a result, receiving characteristic of the DTV receiver is degraded.

Furthermore, the carrier wave recovery portion 113 of FIG. 1 has an asymmetrical frequency offset acquisition performance. That is, the carrier wave recovery portion 113 of FIG. 1 has lower acquisition performance in case of the frequency offset in "−" direction than that in case of the frequency offset in "+" direction.

At this time, since the carrier wave recovery portion 113 and the timing recovery portion 109 operate to affect each other, degradation of acquisition performance in the carrier wave recovery portion 113 is linked to degradation of performance in the timing recovery portion 109.

Also, if a fatal ghost exists in a band used for timing recovery, a signal at a portion where the ghost exists is removed during demodulation. If the timing error is detected using such a signal, wrong timing error information may be detected. In this case, the carrier wave recovery portion 113 is affected by the timing error recovery portion 109, it is not operated normally. If the carrier wave is not recovered, the received data is not recovered normally, thereby degrading performance of the DTV receiver.

SUMMARY OF THE INVENTION

Accordingly, the present invention is directed to a VSB demodulating device and method in a DTV receiver that substantially obviates one or more problems due to limitations and disadvantages of the related art.

An object of the present invention is to provide a VSB demodulating device and method in a DTV receiver, in which a complete digital demodulator is implemented and a carrier wave recovery portion and a timing recovery portion are operated separately so as not to affect each other.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital demodulating device in a digital TV receiver includes: a digital signal processor digitizing pass band signals of a particular channel transmitted in a VSB modulation mode; a base band demodulator multiplying the pass band digital signals by a complex sinusoidal wave with a recovered carrier wave to convert the pass band digital signals to base band digital signals; a carrier wave recovery portion detecting phase error of a carrier wave from base band pilot signals output from the base band demodulator, generating a complex sinusoidal wave relative to the phase error, and outputting the complex sinusoidal wave to the base band demodulator; a resampler interpolating a timing error of current symbols to reduce an error between the base band digital signals output from the base band demodulator; a matched filter filtering the output of the resampler to maximize a signal-to-noise ratio (SNR) at a symbol position; a timing recovery portion obtaining a timing error of the current symbols from an output signal of the matched filter and feeding back the timing error to the resampler; and a channel equalizer compensating channel distortion included in the output signal of the matched filter.

The carrier wave recovery portion includes: a frequency phase error detector detecting frequency offset and phase error from the pilot signals included in the base band digital signals output from the base band demodulator; a loop filter filtering and integrating the output of the frequency phase error detector; and an NCO generating a complex sinusoidal wave relative to the output of the loop filter and feeding back the complex sinusoidal wave to the base band demodulator.

The timing recovery portion includes: a timing error detector detecting timing error information from the output of the matched filter; a loop filter filtering only low band signal components from the timing error information detected by the timing error detector; and an NCO converting output frequency in accordance with the low band signal components of the timing error information and controlling sampling timing of the resampler.

The digital signal processor includes a phase divider dividing the digitized pass band signal into pass band digital signals I and Q.

In another aspect of the present invention, a digital demodulating device in a digital TV receiver includes: a digital signal processor digitizing pass band signals of a particular channel transmitted in a VSB modulation mode; a base band demodulating and carrier wave recovery portion multiplying the pass band digital signals by a complex sinusoidal wave with a recovered feedback carrier wave to convert the pass band digital signals to base band digital signals, and recovering the carrier wave from the converted base band digital signals to feed back the carrier wave; a resampler interpolating a timing error of current symbols to reduce an error between the base band digital signals output from the base band demodulating and carrier wave recovery portion; a timing recovery portion obtaining a timing error of the current symbols from an output signal of the resampler and feeding back the timing error to the resampler; and a channel equalizer compensating channel distortion included in the output signal of the resampler.

The base band demodulating and carrier wave recovery portion includes: a base band demodulator multiplying the pass band digital signals by a complex sinusoidal wave with a recovered carrier wave and converting the pass band digital signals to base band digital signals; and a carrier wave recovery portion detecting phase error of the carrier wave from pilot signals included in the base band digital signals output from the base band demodulator, generating a complex sinusoidal wave relative to the phase error, and feeding back the complex sinusoidal wave to the base band demodulator.

The digital demodulating further includes a matched filter disposed between the resampler and the channel equalizer, for filtering the output of the resampler to maximize a signal-to-noise ratio (SNR) at a position of a symbol output from the resampler, and the timing recovery portion obtains a timing error of the current symbols using an output signal of the matched filter.

In other aspect of the present invention, a digital demodulating method in a digital TV receiver includes the steps of: a) digitizing pass band signals of a particular channel transmitted in a VSB modulation mode; b) multiplying the pass band digital signals by a complex sinusoidal wave with a recovered carrier wave to convert the pass band digital signals to base band digital signals; c) detecting phase error of the carrier wave from pilot signals included in the base band digital signals, generating a complex sinusoidal wave relative to the phase error, and feeding back the complex sinusoidal wave to the step b); d) interpolating a timing error of current symbols to reduce an error between base band digital signals output from the step b); e) filtering an output signal of the step d) to maximize a signal-to-noise ratio (SNR) at a symbol position; f) obtaining a timing error of the current symbols from an output signal of the step e); and g) compensating channel distortion included in the output signal of the step e).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
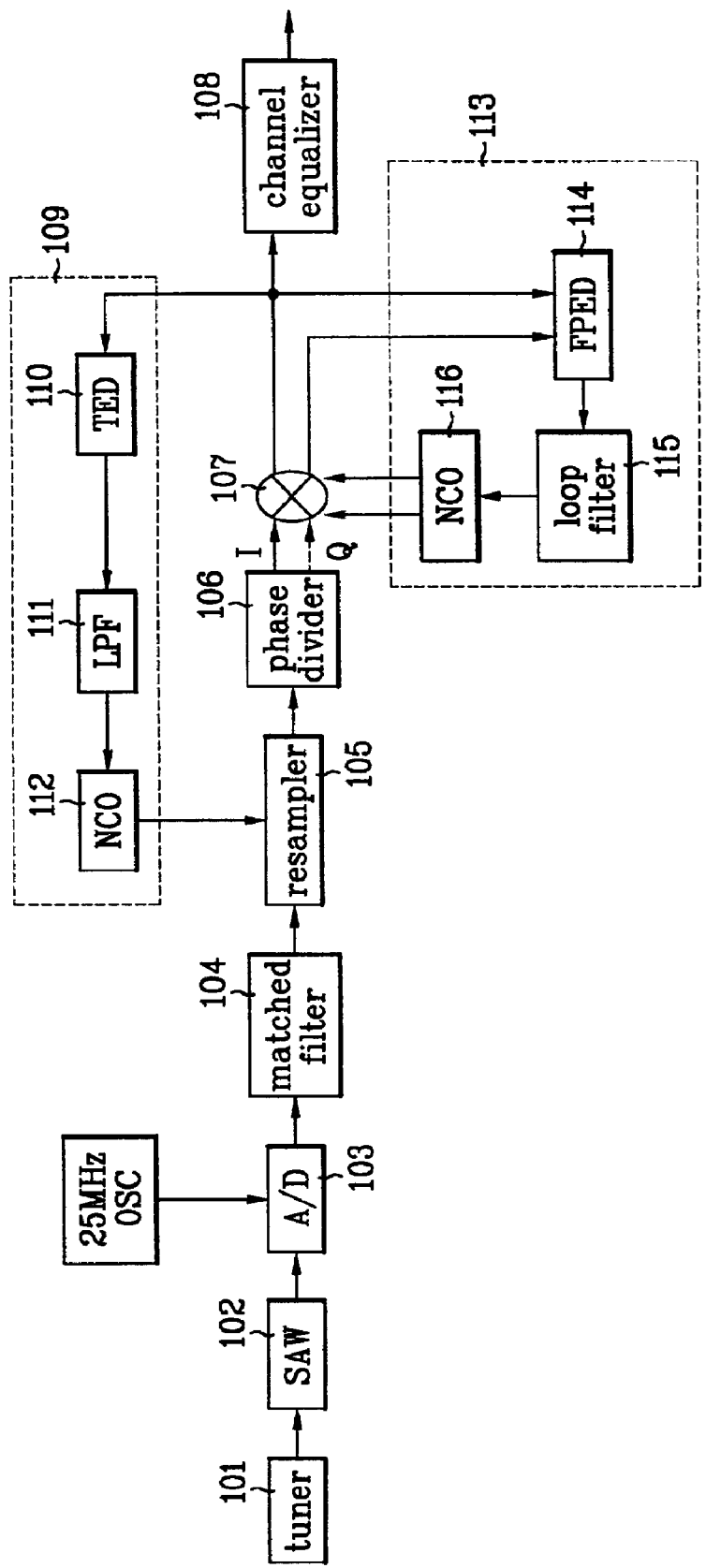
FIG. 1 is a block diagram illustrating an example of a general DTV receiver.
Figure 2:
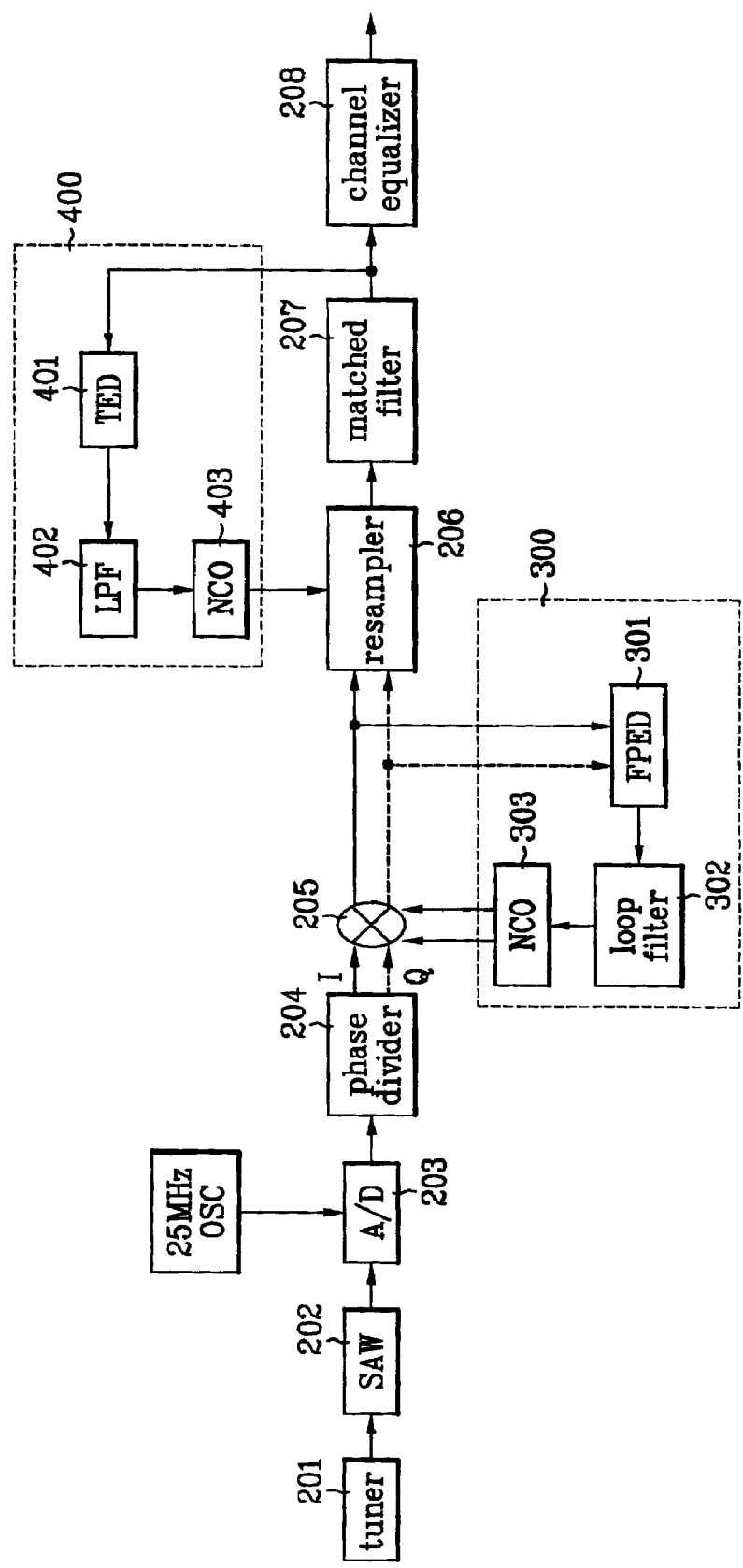
FIG. 2 is a block diagram illustrating an example of a DTV receiver according to the present invention.

FIG. 2 is a block diagram of a DTV receiver according to the present invention. Referring to FIG. 2, the DTV receiver includes a tuner 201, a SAW filter 202, an A/D converter 203, a phase divider 204, a multiplier 205, a resampler 206, a matched filter 207, and a channel equalizer 208. Also, a carrier wave recovery portion 300 is connected with an output terminal of the multiplier 205, and a timing recovery portion 400 is connected with an output terminal of the matched filter 207.

In the present invention, for the convenience of description, the A/D converter 203, the phase divider 204, the multiplier 205, the resampler 206, the matched filter 207, the channel equalizer 208, the carrier wave recovery portion 300, and the timing recovery portion 400 are called a VSB demodulating device. A signal input to the VSB demodulating device is processed in all the digital regions.

In order that the carrier wave recovery portion 300 and the timing recovery portion 400 do not affect each other, the carrier wave recovery portion 300 recovers a carrier wave using the output of the multiplier 205 while the timing recovery portion 400 recovers a symbol clock used for a transmitter using the output of the matched filter 207.

To this end, the output of the tuner 201 is input to the A/D converter 203 through the SAW filter 202. The A/D converter 203 samples the output of the SAW filter 202 with a fixed frequency (ex, 25 MHz) and converts the sampled value to a digital signal.

The output of the A/D converter 203 is input to the phase divider 204, divided into signals I and Q of a pass band, and output to the multiplier 205. The multiplier 205 receives a complex sinusoidal wave with a carrier wave recovered by the carrier wave recovery portion 300 and multiplies the complex sinusoidal wave by pass band digital signals I and Q of the phase divider 204 so that the pass band digital signals I and Q are transited to base band digital signals I and Q.

The base band digital signals I and Q are output to the carrier wave recovery portion 300 and the resampler 206. The resampler 206 receives timing error of current symbols generated by signal processing of the base band from the timing recovery portion 400, interpolates the timing error to reduce an error between digitized signals, and outputs the interpolated value to the matched filter 207.

Meanwhile, the carrier wave recovery portion 300 removes phase error and frequency offset of the carrier wave from a base band pilot signal output from the multiplier 205 and then generates a complex sinusoidal wave relative to the signal having no frequency offset and phase error so that the complex sinusoidal wave is fed back to the multiplier 205. Therefore, the multiplier 205 outputs the base band digital signal with the recovered frequency offset and phase error to the resampler 206.

In other words, a frequency phase error detector 301 of the carrier wave recovery portion 300 detects frequency offset and phase error from the base band pilot signal output from the multiplier 205 and outputs the detected frequency offset and phase error to the loop filter 302. The loop filter 302 filters and integrates the output of the frequency phase error detector 301 and then outputs the resultant value to the NCO 303. The NCO 303 generates a complex sinusoidal wave relative to the output of the loop filter 302 and then outputs the generated complex sinusoidal wave to the multiplier 205.

Meanwhile, the matched filter 207 which received the output of the resampler 206 is a digital matched filter having the same roll-off value as that of a square root matched filter used in the transmitter. Accordingly, once a symbol signal synchronized by the resampler 206 passes through the matched filter 207, SNR at the symbol position is maximized.

The output of the matched filter 207 is output to the timing recovery portion 400 and at the same time is output to the channel equalizer 207. Thus, distortion generated by passing through a channel is compensated. Also, the channel equalizer 207 recovers synchronizing signals inserted during transmission from the base band signal I and recovers received data, i.e., transmitting symbols using the synchronizing signals.

The timing recovery portion 400 includes a timing error detector 401, a loop filter 402, and an NCO 403. The timing error detector 401 detects timing error information from the output of the matched filter 207. The loop filter 402 filters low band signal components only from the timing error information. The NCO 403 converts the output frequency in accordance with the low band signal components of the timing error information and controls sampling timing of the resampler 206.

In more detail, the timing error detector 401 detects the timing error information from symbol samples output from the matched filter 207 and then outputs the detected timing error information to the loop filter 402. The loop filter 402 filters only low band signal components of the timing error information detected from the timing error detector 401 and outputs the filtered low band signal components to the NCO 403. The NCO 403 converts the output frequency in accordance with the low band signal components of the timing error information and then controls sampling timing of the resampler 206.

As described above, since the matched filter conventionally disposed in the pass band is disposed in the base band and timing recovery is implemented using the output of the matched filter after the resampler is disposed at the rear of the carrier wave recovery portion, the VSB demodulating device and method in the DTV receiver according to the present invention has the following advantages.

First, symmetrical frequency offset acquisition performance can be obtained in the carrier wave recovery portion. Particularly, acquisition performance in "−" direction can significantly be improved.

Second, since the carrier wave recovery portion and the timing recovery portion are operated separately, the carrier wave recovery portion is robust even if the ghost fatal to the band used for timing recovery exists. This is because that the characteristic of the timing recovery portion does not affect the carrier wave recovery portion.

Therefore, in view of design of the VSB receiver, a closed loop control is independently available for the carrier wave recovery portion and the timing recovery portion. Robustness of the system is increased. Thus, the whole performance of the DTV receiver can be improved.

Furthermore, since parameters for carrier wave recovery and symbol clock recovery can be obtained even under the channel with a serious ghost, performance of the demodulating device can be improved.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A digital demodulating device in a digital TV receiver comprising:
   a digital signal processor digitizing pass band signals of a particular channel transmitted in a VSB modulation mode;
   a base band demodulator multiplying the pass band digital signals by a complex sinusoidal wave with a recovered carrier wave to convert the pass band digital signals to base band digital signals;
   a carrier wave recovery portion detecting phase error of a carrier wave from base band pilot signals output from the base band demodulator, generating a complex sinusoidal wave relative to the phase error, and outputting the complex sinusoidal wave to the base band demodulator;
   a resampler interpolating a timing error of current symbols to reduce an error between the base band digital signals output from the base band demodulator;
   a matched filter filtering the output of the resampler to maximize a signal-to-noise ratio (SNR) at a symbol position;
   a timing recovery portion obtaining a timing error of the current symbols from an output signal of the matched filter and feeding back the timing error to the resampler; and
   a channel equalizer compensating channel distortion included in the output signal of the matched filter.

2. The digital demodulating device of claim 1, wherein the carrier wave recovery portion includes:
   a frequency phase error detector detecting frequency offset and phase error from the pilot signals included in the base band digital signals output from the base band demodulator;
   a loop filter filtering and integrating the output of the frequency phase error detector; and
   an NCO generating a complex sinusoidal wave relative to the output of the loop filter and feeding back the complex sinusoidal wave to the base band demodulator.

3. The digital demodulating device of claim 1, wherein the timing recovery portion includes:
   a timing error detector detecting timing error information from the output of the matched filter;
   a loop filter filtering only low band signal components from the timing error information detected by the timing error detector; and
   an NCO converting output frequency in accordance with the low band signal components of the timing error information and controlling sampling timing of the resampler.

4. The digital demodulating device of claim 1, wherein the digital signal processor includes a phase divider dividing the digitized pass band signal into pass band digital signals I and Q.

5. A digital demodulating device in a digital TV receiver comprising:
   a digital signal processor digitizing pass band signals of a particular channel transmitted in a VSB modulation mode;
   a base band demodulating and carrier wave recovery portion multiplying the pass band digital signals by a complex sinusoidal wave with a recovered feedback carrier wave to convert the pass band digital signals to base band digital signals, and recovering the carrier wave from the converted base band digital signals to feed back the carrier wave;
   a resampler interpolating a timing error of current symbols to reduce an error between the base band digital signals output from the base band demodulating and carrier wave recovery portion;
   a timing recovery portion obtaining a timing error of the current symbols from an output signal of the resampler and feeding back the timing error to the resampler; and
   a channel equalizer compensating channel distortion included in the output signal of the resampler.

6. The digital demodulating device of claim 5, wherein the digital signal processor includes a phase divider dividing the digitized pass band signal into digital signals I and Q.

7. The digital demodulating device of claim 5, wherein the base band demodulating and carrier wave recovery portion includes:

a base band demodulator multiplying the pass band digital signals by a complex sinusoidal wave with a recovered carrier wave and converting the pass band digital signals to base band digital signals; and a carrier wave recovery portion detecting phase error of the carrier wave from pilot signals included in the base band digital signals output from the base band demodulator, generating a complex sinusoidal wave relative to the phase error, and feeding back the complex sinusoidal wave to the base band demodulator.

8. The digital demodulating device of claim 7, wherein the carrier wave recovery portion includes:

a frequency phase error detector detecting frequency offset and phase error from the pilot signals included in the base band digital signals output from the base band demodulator;

a loop filter filtering and integrating the output of the frequency phase error detector; and an NCO generating a complex sinusoidal wave relative to the output of the loop filter and feeding back the complex sinusoidal wave to the base band demodulator.

9. The digital demodulating device of claim 5, further comprising a matched filter disposed between the resampler and the channel equalizer, for filtering the output of the resampler to maximize a signal-to-noise ratio (SNR) at a position of a symbol output from the resampler, wherein the timing recovery portion obtains a timing error of the current symbols using an output signal of the matched filter.

10. The digital demodulating device of claim 9, wherein the timing error recovery portion includes:

a timing error detector detecting timing error information from the output signal of the matched filter;

a loop filter filtering only low band signal components of the timing error information detected by the timing error detector; and an NCO converting output frequency in accordance with the low band signal components of the timing error information and controlling sampling timing of the resampler.

11. A digital demodulating method in a digital TV receiver comprising the steps of:

a) digitizing pass band signals of a particular channel transmitted in a VSB modulation mode;

b) multiplying the pass band digital signals by a complex sinusoidal wave with a recovered carrier wave to convert the pass band digital signals to base band digital signals;

c) detecting phase error of the carrier wave from pilot signals included in the base band digital signals, generating a complex sinusoidal wave relative to the phase error, and feeding back the complex sinusoidal wave to the step b);

d) interpolating a timing error of current symbols to reduce an error between base band digital signals output from the step b);

e) filtering an output signal of the step d) to maximize a signal-to-noise ratio (SNR) at a symbol position;

f) obtaining a timing error of the current symbols from an output signal of the step e); and g) compensating channel distortion included in the output signal of the step e).

12. The digital demodulating method of claim 11, wherein the step a) includes the step of dividing the digitized pass band signals into pass band digital signals I and Q.

13. The digital demodulating method of claim 11, wherein the step c) includes the steps of:

detecting frequency offset and phase error from the pilot signals included in the base band digital signals output from the step b);

filtering and integrating the frequency offset and phase error; and generating a complex sinusoidal wave relative to the integrated frequency offset and phase error and feeding back the complex sinusoidal wave to the step b).

14. The digital demodulating method of claim 11, wherein the step f) includes the steps of:

detecting timing error information from the output of the step e);

filtering only low band signal components of the detected timing error information; and converting output frequency in accordance with the low band components of the timing error information and controlling sampling timing of the step d).

* * * * *